US012638002B2

(12) United States Patent
Herrig et al.

(10) Patent No.: US 12,638,002 B2
(45) Date of Patent: May 26, 2026

(54) LEADING EDGE PROTECTION WITH REDUCED NOISE IMPACT

(71) Applicant: LM WIND POWER A/S, Kolding (DK)

(72) Inventors: Andreas Herrig, Salzbergen (DE); Horacio Bulacio, Kolding (DK); Hans Minnee, DH Heerhugowaard (NL)

(73) Assignee: LM WIND POWER A/S, Kolding (DK)

( * ) Notice: Subject to any disclaimer, the term of this patent is extended or adjusted under 35 U.S.C. 154(b) by 257 days.

(21) Appl. No.: 18/278,262

(22) PCT Filed: Feb. 14, 2022

(86) PCT No.: PCT/EP2022/053507
§ 371 (c)(1),
(2) Date: Aug. 22, 2023

(87) PCT Pub. No.: WO2022/171862
PCT Pub. Date: Aug. 18, 2022

(65) Prior Publication Data
US 2024/0133358 A1    Apr. 25, 2024
US 2024/0229763 A9    Jul. 11, 2024

(30) Foreign Application Priority Data

Feb. 12, 2021    (EP) ..................................... 21156977

(51) Int. Cl.
F03D 1/06           (2006.01)
(52) U.S. Cl.
CPC ...... F03D 1/0688 (2023.08); F05B 2240/303 (2020.08); F05B 2250/183 (2013.01); F05B 2260/96 (2013.01)

(58) Field of Classification Search
CPC ................. F03D 1/0675; F03D 1/0688; F05B 2240/303; F05B 2250/183; F05B 2260/96
See application file for complete search history.

(56) References Cited

U.S. PATENT DOCUMENTS 11,220,998 B2 *  1/2022  Fujioka .................. H02K 7/183
11,459,086 B2 *  10/2022  Farouz-Fouquet ....... B64C 9/24
(Continued)

FOREIGN PATENT DOCUMENTS

EP          3144525 A1      3/2017
WO      2019115372 A1      6/2019

*Primary Examiner* — Sang K Kim
(74) *Attorney, Agent, or Firm* — Nath, Goldberg & Meyer; Jerald L. Meyer; Tanya E. Harkins

(57)          ABSTRACT

The present invention relates to a leading edge protection for a wind turbine blade, wherein a leading edge axis of the leading edge protection is configured to be fitted on at least part of a leading edge of a wind turbine blade and the leading edge protection is configured to extend between the leading edge and a first edge downstream a first side of the wind turbine blade as well as between the leading edge and a second edge downstream a second side of the wind turbine blade, wherein the leading edge protection comprises a first part and wherein the first edge is configured to be non-parallel with the leading edge of the wind turbine blade along the first part of the leading edge protection. The present invention further relates to a wind turbine blade comprising the leading edge protection and a wind turbine comprising the wind turbine blade. Finally, the present invention relates to a method for protecting a leading edge of a wind turbine blade arranged on a wind turbine and a leading edge protection obtainable by that method.

32 Claims, 5 Drawing Sheets

(56)  References Cited

U.S. PATENT DOCUMENTS

Figure 1:
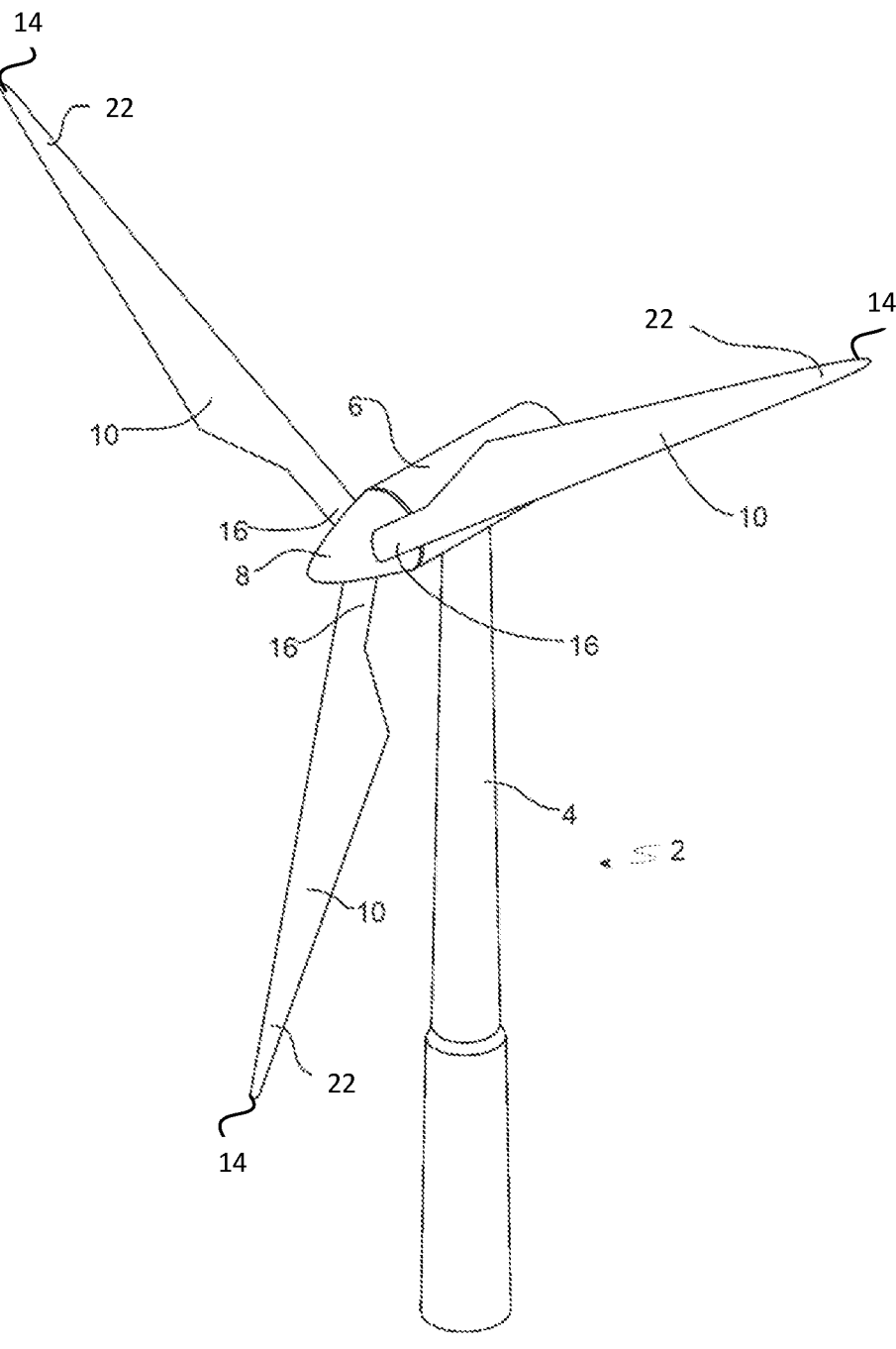

| 11,773,824 B2 * | 10/2023 | Nielsen | .................... B29C 70/54 |
| | | | 416/229 R |
| 11,939,947 B2 * | 3/2024 | Ramanujam | ........ F03D 1/06495 |
| 12,163,502 B2 * | 12/2024 | Behmer | ................ F03D 1/0675 |
| 2011/0006165 A1 | 1/2011 | Ireland | |
| 2020/0063718 A1 | 2/2020 | Ruijter et al. | |

* cited by examiner

A

B

LEADING EDGE PROTECTION WITH REDUCED NOISE IMPACT

This is a National Phase Application filed under 35 U.S.C. 371 as a national stage of PCT/EP2022/053507, filed Feb. 14, 2022, an application claiming the benefit of British Patent Application No. 21156977.7, filed Feb. 12, 2021, the content of each of which is hereby incorporated by reference in its entirety.

FIELD OF INVENTION

The present invention relates to a leading edge protection for a wind turbine blade, a wind turbine blade comprising the leading edge protection and methods for manufacturing a wind turbine blade comprising the leading edge protection.

BACKGROUND OF THE INVENTION

The blades of modern wind turbines capture kinetic wind energy by using sophisticated blade design created to maximise efficiency. The blades are typically made from a fibre-reinforced polymer material and comprise a pressure side shell half and a suction side shell half. The cross-sectional profile of a typical blade includes an airfoil for creating an air flow leading to a pressure difference between the two sides. The resulting lift force generates torque for producing electricity.

The shell halves of wind turbine blades are usually manufactured using blade moulds. First, a blade gel coat or primer is applied to the mould. Subsequently, fibre reinforcement and/or fabrics are placed into the mould in layers followed by resin infusion. The resulting shell halves are assembled by being glued or bolted together substantially along a chord plane of the blade. In many cases, wind turbine blades are made in large parts, e.g., as two aeroshells with load-carrying spar caps and internal webs that are then bonded together.

During the lifetime of a wind turbine, considerable resources are expended on continued maintenance operations to ensure optimum turbine performance. With regard to the blades of a wind turbine, erosion at the leading edge of the blades is one area of attention.

It is known to provide a leading edge protection, such as an erosion shield at the leading edge of a wind turbine blade. The erosion shield may comprise a layer or coating of resilient erosion resistant material, which is applied along the length of the blade covering the leading edge. The erosion shield provides improved resistance to erosion, being usually formed of a resilient material as opposed to the relatively brittle fibre composite material used to produce the body of a wind turbine blade and the relatively soft gelcoat or topcoat having insufficient erosion protection capability, too, and accordingly acts to improve the overall durability of the wind turbine blade. A plurality of different types of shields made from different material exist. The leading edge protection may be arranged on the leading edge during manufacturing or be retrofitted to the leading edge of a wind turbine blade. Normally, the leading edge protection is adhered to the leading edge. Some leading edge protections are very thin or have chamfered edges to avoid noise generations at the step between the leading edge protection and the wind turbine blade. When the edges of the leading edge protection are not flush with the surface of the wind turbine blade, noise may be a problem. This is undesired, as especially on-shore wind turbines should be as soundless as possible. To avoid this problem, some wind turbine blades comprise a recess in the leading edge area, wherein the leading edge protections can be arranged to obtain a flush surface between the edges of the leading edge protection and the wind turbine blade. However, it has proven very difficult to place the large leading edge protections precisely in the recess and manufacturing time and cost may increase. Also, retrofit or repair of existing blades requires add-on leading edge protection solutions, demanding a thickness trade-off between durability and aerodynamic and acoustic impact. For retrofit solution, the formation of the aforementioned recess, would require significant pre-treatment of the blade to form the recess, which is tedious and may even lead to damage of the blade.

The different types of leading edge protection have different advantages and drawbacks in relation to manufacturing time, price, erosion resistance and noise generation.

For example, thicker leading edge protection without a chamfered edge is cheap and easy to manufacture and has a good erosion resistance. However, when thicker and wider leading edge protection is used, the larger backwards-facing step of the LEP is intentionally pushed more downstream, where the laminar boundary layer is having higher disturbance amplitudes and a tendency to separate. In an unstable laminar boundary layer interacting with an edge of the leading edge protection, acoustic-aerodynamic feedback loops can form, creating strong radiation of sound waves at particular frequencies (tones). The occurrence of such undesired tones increases the sound pressure level emitted from a wind turbine blade and possibly leads to additional penalties on top of the increased level.

Hence, improved leading edge protections and methods for manufacturing cheap leading edge protections with a good erosion resistance and a decreased noise impact would be advantageous.

Object of Disclosure

Thus, an object of the present invention is to provide a leading edge protection for a wind turbine blade, which at least ameliorates some of the aforementioned problems or provides a useful alternative to the prior art. In particular, it is an object of the present invention to provide a leading edge protection for a wind turbine blade which is easy and cheap to manufacture and has a reduced noise level compared to similar leading edge protections. It is a further object of the present invention to provide a method allowing appliance of thicker foil LEP on wind turbine blades and avoidance of laminar boundary layer feedback loop noise.

SUMMARY OF INVENTION

The present inventors have found that one or more of said objects may be achieved in a first aspect of the invention relating to a leading edge protection for a wind turbine blade, wherein a leading edge axis of the leading edge protection is configured to be fitted on at least part of a leading edge of a wind turbine blade and the leading edge protection is configured to extend between the leading edge and a first edge downstream a first side of the wind turbine blade as well as between the leading edge and a second edge downstream a second side of the wind turbine blade, wherein the leading edge protection comprises a first part and wherein the first edge is configured to be non-parallel with the leading edge and/or a natural transition line of the wind turbine blade along the first part of the leading edge protection.

Similarly, one or more of the objects may be achieved by a wind turbine blade, which comprises a tip region as well as a leading edge and a trailing edge, wherein the wind turbine blade is provided with a leading edge protection, wherein the leading edge protection comprises a leading edge axis that is fitted on at least part of the leading edge of the wind turbine blade and wherein the leading edge protection extends between the leading edge and a first edge downstream a first side of the wind turbine blade as well as between the leading edge and a second edge downstream a second side of the wind turbine blade, wherein the leading edge protection comprises a first part, wherein the first edge is configured non-parallel with the leading edge and/or a natural transition line of the wind turbine blade along the first part of the leading edge protection.

As stated above, the edges of the leading edge protection may be defined relative to the leading edge of the blade (or the leading edge axis of the leading edge protection) or in relation to the natural transition line. However, according to a preferred embodiment, the edges are defined relative to the natural transition line, because this is the important parameter for reducing noise or tonal noise. The natural transition line need not be parallel to the leading edge of the blade and typically it will not be parallel to the leading edge, at least along some spanwise regions.

In one embodiment, the first edge has a non-constant distance to the leading edge axis and is configured to have a non-constant distance to the leading edge along the first part of the leading edge protection. It is further emphasised that the term "non-parallel" defines that the first edge that is manufactured specifically to have a different angle from the leading edge and/or the natural transition line, when the leading edge protection is mounted on the wind turbine blade. It is also clear that this extends beyond tolerances of the manufactured leading edge protection and the blade. In one embodiment, the difference in angle between the natural transition line (or the leading edge) and the first edge, when mounted on the wind turbine blade, is at least 2 degrees, preferably at least 5 degrees, and even more preferably at least 10 degrees.

As alternative definition to "non-parallel", the first edge may be configured off-set at an angle compared to the leading edge and/or a natural transition line of the wind turbine blade along the first part of the leading edge protection, or be configured at an angle different from 0 relative to the leading edge and/or a natural transition line of the wind turbine blade along the first part of the leading edge protection, or be configured to be angled relative to the leading edge and/or a natural transition line of the wind turbine blade along the first part of the leading edge protection.

By letting the first edge be non-parallel to the leading edge, it is essentially also ensured that the first edge is non-parallel to a natural transition line of the laminar boundary layer on the wind turbine blade. Accordingly, the first edge will typically be non-parallel to both the leading edge and the natural transition line. Thereby, the noise that stems from the drop from first edge of the leading edge protection to the blade can be reduced by suppressing or modulating said noise.

The natural transition line is defined as the line at which the laminar flow at operational conditions of the wind turbine blade transitions into turbulent flow on or over the blade surface. The operational conditions can for instance be the design point of the wind turbine blade.

In the following, preferred embodiments are described. These may relate to both the leading edge protection and the wind turbine blade according to the first aspect.

In preferred embodiments, the first side is a suction side of the wind turbine blade, and the second side is a pressure side of the wind turbine blade. Accordingly, the first edge is preferably arranged relative to the natural transition line on the suction side of the wind turbine blade.

The leading edge of a wind turbine blade has several sections with different curvatures. Often, the tip region is quite curved along the leading edge, whereas the remaining leading edge of the airfoil region may be substantially linear. However, the tip region may also be substantially linear along the leading edge. The curvature at the tip region of the blade makes fitting of a leading edge protection at the tip region difficult due to double-curvature of the surface.

The leading edge protection disclosed herein is not necessarily configured to extend along the whole length of the leading edge but may only be configured to extend along part of it, such as only along the tip region or such as only along ⅓ of the total length of the leading edge of a wind turbine blade.

The leading edge protection as disclosed herein comprises at least a first part and optionally also a second part and/or further parts. In some embodiments, the leading edge protection consists of the first part. In preferred embodiments, the leading edge protection consists of the first and the second part. In some embodiments the leading edge protection comprises the first and second part, as well as further parts.

The first part of the leading edge protection herein preferably refers to the part of the leading edge protection configured to be fitted to the tip region of the wind turbine blade, wherein the second part of the leading edge protection preferably refers to the remaining part of the leading edge protection configured to be fitted to a substantially linear airfoil region of the blade. Thus, in some embodiments, the first part of the leading edge protection is configured to be fitted on a tip region of the leading edge of the wind turbine blade and in some embodiments, the leading edge protection comprises a second part which is configured to extend from the first part and be fitted to the leading edge of the wind turbine blade along part of an airfoil region where the leading edge is substantially linear. In some embodiments, the tip region is curved and extends from a tip of the wind turbine blade and to 0.5-3 metres along a longitudinal axis of the wind turbine blade. The span of 0.5-3 metres is due to the differences in the total length of wind turbine blades and thereby the differences in the length of the tip section.

In some embodiments, the first part of the leading edge protection is configured to extend at least 10%, such as 15%, such as at least 25% of the total leading edge protection length on the wind turbine blade. In some embodiments, the second part of the leading edge protection is configured to extend less than 90%, such as less than 85%, such as less than 75% of the total leading edge protection length on the wind turbine blade.

The shape of the first edge is of particular importance for the present invention. As previously mentioned, the first edge is configured to be non-parallel with a natural transition line of the laminar boundary layer along the first part of the leading edge protection. In an unstable laminar boundary layer interacting with an edge of the leading edge protection, acoustic-aerodynamic feedback loops can form, creating strong radiation of sound waves at particular frequencies (tones). The occurrence of such undesired tones increases the sound pressure level emitted from a wind turbine blade and can possibly lead to additional penalties on top of the increased noise level. By having a first edge which is non-parallel with the natural transition line of the laminar boundary layer, the feedback loops will not create sound waves at the same frequencies along the first edge. Thus, the overall noise can be reduced by preventing constructive amplification to occur over longer portions of span or modulating the noise. This is particularly advantageous for a leading edge having a step at the first edge, i.e. where the first edge is not flush with the first side of the wind turbine blade. Such a leading edge protection is easier and cheaper to manufacture than a leading edge protection with an edge flush with the surface of the first side of the wind turbine blade.

In a preferred embodiment, the leading edge protection is configured such that the first edge has an angle relative to the leading edge and/or the natural transition line that on average is at least 5 degrees along the first part of the leading edge protection. In other words, the magnitude (or absolute value) of the angle between the first edge and the natural transition line locally deviates with at least 5 degrees as seen on an average along the spanwise extent of the first part of the leading edge protection. This can also be formulated as "mean $(|\rho(r)|) >= 5$ degrees)", where $\rho(r)$ is the local angle between the first edge and the natural transition line as a function of the local radial position r.

In another preferred embodiment, the leading edge protection is configured to cross the natural transition line of the wind turbine blade such that the first edge is arranged upstream of the natural transition line along one or more regions and further is arranged downstream of the natural transition line along one or more other regions along the first part of the wind turbine blade. For instance, the first part may comprise at least a first region, in which the leading edge is located upstream of the natural transition line, wherein the first region being arranged between two other regions in which the first edge is located downstream of the natural transition line. In yet another preferred embodiment, the first edge crosses the natural transition line at a plurality of positions along the first part of the leading edge protection.

In one preferred embodiment, the leading edge protection is configured such that the first edge at all positions along the first part is located no more than 15 cm upstream of the natural transition line of the blade. It is noted that the position of the natural transition line may change depending on e.g. angle of attack, local rotor speed, turbulence, and roughness changes. However, the natural transition line is well-defined for a smooth airfoil profile at the design point of the wind turbine blade and wind turbine. In a particularly preferred embodiment, the first edge at all positions along the first part is located no more than 15 cm upstream of the natural transition line of the blade at the various operating conditions of the wind turbine blade and wind turbine.

In some embodiments, the first edge of the leading edge protection is configured to be non-linear along the first part of the leading edge protection. By having a non-linear first edge, the acoustic-aerodynamic feedback loops will not form respectively not be in phase along the whole first edge, thereby decreasing sound waves at particular frequencies. By non-linear is not meant that the leading edge protection may not comprise linear parts, but rather that the first edge should not be one linear, straight piece along the first part.

In some embodiments, the leading edge protection comprises a first point on the first edge having a first distance to the leading edge axis and a second point on the first edge having a second distance to the leading edge axis. In some embodiments, the first point is configured to be arranged more proximal to the tip of the wind turbine blade than the second point, and the second distance is larger than the first distance, i.e. the distance increases from the first to the second point. The first and second points are each arranged on the first part of the leading edge protection.

In some embodiments, the first point is configured to be arranged most proximal to the tip of the wind turbine blade on the first part of the leading edge protection, and the second point is configured to be arranged most distal to the tip of the wind turbine blade on the first part of the leading edge protection.

In some embodiments, the leading edge protection further comprises a third point on the first edge having a third distance to the leading edge axis, wherein the third point is configured to be arranged more proximal to the tip of the wind turbine blade than the first point on the first part of the leading edge protection. In some embodiments, the third distance is larger than the first distance, i.e. the distance decreases from the third to the first point.

In preferred embodiments, the first point is configured to be arranged more proximal to the tip of the wind turbine blade than the second point, and the third point is configured to be arranged more proximal to the tip of the wind turbine blade than the first point. Furthermore, the second and the third distance are both larger than the first distance.

In some embodiments, the first edge of the leading edge protection comprises a plurality of sets of points, wherein each set of points includes a first point, a second point and a third point, wherein the first point is configured to be arranged more proximal to the tip of the wind turbine blade than the second point and the third point is configured to be arranged more proximal to the tip of the wind turbine blade than the first point. Furthermore, the second distance and the third distance are both larger than the first distance.

The plurality of sets of points may include a primary set of points, a secondary set of points, a tertiary set of points etc. The plurality of sets of points may be arranged on the first edge along the first part of the leading edge, such that the primary set of points is configured to be arranged most proximal to the tip of the wind turbine blade, the secondary set of points is configured to be arranged more distal to the tip of the wind turbine blade than the primary set of points, the tertiary set of points is configured to be arranged more distal to the tip of the wind turbine blade than the primary and secondary set of points etc.

In some embodiments, all the first points in the plurality of sets of points have a first distance to the leading edge axis, all the second points in the plurality of sets of points have a second distance to the leading edge axis, and all the third points in the plurality of sets of points have a third distance to the leading edge axis. In this way, the first edge may extend in a repeating, but not necessarily periodic pattern along the leading edge axis.

However, in some embodiments the first, second and third distances may also be different between one or more of the plurality of sets of points, e.g. a primary first distance may be different than a secondary first distance and/or a tertiary first distance etc. In this way, the first edge may extend in a varying pattern along the leading edge axis. In some embodiments, the first, second and third distances may also increase from the primary set of points to the secondary set of points and from the secondary set of points to the tertiary set of points. In this way, the first edge may extend in a repeating pattern along the leading edge axis, but the plurality of sets of points has an increasing distance to the leading edge axis the more distal to the tip they are arranged.

In some embodiments, the ratio between the first distance and the second distance or the third distance and first distance is between 1:1.10 and 1:10, such as between 1:1.1 and 1:5, such as between 1:1.25 and 1:2.

A distance between a point on the first or second edge of the leading edge protection relative to the leading edge axis is preferably defined as the shortest distance from that point to the leading edge axis, i.e. locally in a direction normal to the leading edge. The first, second and third points may be any points on the first edge on the first part of the leading edge protection.

In some embodiments, the first edge is configured to be arch shaped or curved along the first part of the leading edge protection, when the leading edge protection is fitted to the wind turbine blade.

In some embodiments, the first edge extends in a pattern along the first part of the leading edge protection, such as a zig-zag pattern, a crescent pattern, a sawtooth pattern or a wavy pattern. In some embodiments, the first edge of the leading edge protection extends along the first part of the leading edge protection in a repeating pattern.

In some embodiments, the first edge is non-parallel to a longitudinal axis of the wind turbine blade along the first part of the leading edge protection. The longitudinal axis of the wind turbine blade preferably extends between the tip of the wind turbine blade and a centre point of the root section.

In preferred embodiments, the first edge is configured to be non-parallel with a natural transition line of the laminar boundary layer along the first part of the leading edge protection.

In some embodiments, part of the first edge is configured to be fitted to the first side of the wind turbine blade downstream of the natural transition line of the laminar boundary layer along the first part of the leading edge protection, or at least so that a part of the first edge is arranged downstream of the natural transition line. By locating the edge such that it is not in the zone of laminar boundary layer instabilities or laminar separation bubble formation i.e. such that at least part of it is always in the turbulent region more downstream, noise generation can also be avoided.

In a preferred embodiment, the edge of the leading edge protection is configured to cross the natural transition line of the boundary layer so the leading edge protection, when mounted to the blade, has an edge, which is arranged upstream of the natural transition line along some part or parts, and arranged downstream of the natural transition line along another part or parts of the wind turbine blade. The edge of the leading edge protection may for instance have a wavy pattern that crosses the natural transition lines at a plurality of positions along the wind turbine blade.

The shape of the first edge and/or second edge is of particular importance for the present invention. The technical effects described herein may be obtained by having a specific shape of the first edge and/or second edge along the first part of the leading edge protection. However, the same effects may be obtained by having the specific shape of the first edge and/or second edge along the whole length of the leading edge protection. Thus, it is to be understood that everything described above for the first edge along the first part of the leading edge protection may also apply along the whole length of the leading edge protection, including along the second part of the leading edge protection. Furthermore, everything described above for the first edge may also apply for the second edge.

In some embodiments, the leading edge protection is configured to be symmetric around the leading edge of a wind turbine blade, at least along some parts of the wind turbine blade. In other embodiments, the leading edge protection is configured to be asymmetric around the leading edge of the wind turbine blade, at least along some parts of the blade. In embodiments where the leading edge protection is asymmetric around the leading edge, the second edge may be configured to be substantially parallel to the leading edge of the wind turbine blade along the first part. Furthermore, a mean distance between the second edge and the leading edge axis is preferably shorter than a mean distance between the first edge and the leading edge axis along the first and/or second part of the leading edge protection.

The leading edge protection according to the present disclosure is preferably a foil or a film which has a planform configuration before it is arranged on a wind turbine blade and an in-use configuration when it is fitted to the wind turbine blade. Such a foil or film may be simply be cut in the desired shape from a large flat foil or film in the desired material and then be fitted to the wind turbine blade. Preferably, an adhesive is added to the leading edge protection or wind turbine blade before fitting is performed.

In other embodiments, the leading edge protection may be a cap made of a more rigid material and moulded such that it is configured to the leading edge protection even before it is arranged on the wind turbine blade.

In some embodiments, the leading edge protection has a thickness between 0.05 mm-10 mm, preferably between 0.1 mm-2 mm, and more preferably between 0.2 mm-2 mm.

In preferred embodiments, the leading edge protection comprises or essentially consists of an erosion-resistant material, such as polyurethane.

In some embodiments, the leading edge protection is designed such that it has a trapezoid shape in the planform configuration and a curved first and/or second edge along the first part of the leading edge protection in the in-use configuration. It has been found that a trapezoid planform configuration of the leading edge protection makes the leading edge protection particularly easy to apply at a tip region of the wind turbine blade. Furthermore, the number of wrinkles and unevenness which may otherwise arise is reduced or eliminated by having this particular shape.

The leading edge protection further comprises a third edge extending between the leading edge axis and the first edge, at a position most proximal to the tip of the wind turbine blade. In some embodiments, the third edge is arranged at a distance, such as between 0.5-10 cm from the tip of the wind turbine blade. In some embodiments, the most proximal part of the leading edge axis ends at a point more proximal to the tip of the wind turbine blade than the most proximal part of the first edge. In some embodiments, the third edge extends between the most proximal part of the leading edge axis and the most proximal part of the first edge at an angle between 40 and 85 degrees relative to the leading edge axis or the natural transition line. An angle between 40 and 85 degrees, more preferably between 80 and 45 degrees, makes fitting of the leading edge protection close to the tip easier, avoids possible peel-off problems from tip-vortex interaction and still allows the leading edge protection to cover part of the tip region close to the tip leading edge. If the angle is less than 40 degrees, the part of the leading edge protection closest to the tip will not be covered to the same extent. If the angle is more than 85 degrees, it becomes more difficult to fit the leading edge protection to the tip.

In some embodiments, the leading edge protection comprises a groove or step with a wavy shape upstream of the first edge. This groove or step may act as a laminar boundary layer trip upstream of the first edge of the leading edge protection. The shapes described as preferred for the first edge may also advantageously be applied to such a groove or step to avoid it from being a trigger for feedback loop tones itself. Some spanwise disrupted form of groove or step or regular or irregular arrangement of roughness elements may also be used as a boundary layer trip.

In a second aspect, the present disclosure relates to a wind turbine blade comprising a leading edge protection according to the first aspect of the present disclosure.

In a third aspect, the present disclosure relates to a wind turbine comprising a wind turbine blade according to the first aspect of the present disclosure. In preferred embodiments, the first edge of the leading edge protection is non-parallel with the natural transition line of the laminar boundary layer when the wind turbine blade is within a range of pre-determined operating conditions. In some embodiments, a part of the first edge is fitted with the first side of the wind turbine blade downstream of the natural transition line of the laminar boundary layer when the wind turbine blade is within a range of pre-determined operating conditions, e.g. pitch angle and/or rotational speed of the wind turbine blade. The pre-determined operating conditions may for instance be the design point of the wind turbine blade.

In a fourth aspect, the present disclosure relates to a method for protecting a leading edge of a wind turbine blade arranged on a wind turbine, the method comprising the steps of:

determining a plurality of operating conditions under which the wind turbine will be operated for a period of time,
 estimating a plurality of locations of natural transition lines of a laminar boundary layer on a first side of the wind turbine blade based on the plurality of operating conditions and an estimation of wind conditions during the period of time,
 designing a leading edge protection for the wind turbine blade according to the first aspect of the present invention, such that the first edge along a first part of the leading edge protection is configured to be non-parallel with the natural transition lines under the plurality of operating conditions and/or such that a part of the first edge is configured to be fitted to the first side of the wind turbine blade downstream of the natural transition line along the first part of the leading edge protection,
 fitting the leading edge protection to the wind turbine blade.

The leading edge protection may be retrofitted to a wind turbine blade on a wind turbine or fitted on a wind turbine blade which is subsequently installed on a wind turbine. The wind turbine whereon the wind turbine blade comprising the leading edge protection is fitted should be configured to be operated at the plurality of operating conditions for a period of time. The plurality of operating conditions may be pitch angle, rotational speed etc. The period of time may be a period of time where the wind conditions equal the estimated wind conditions during the period of time. In this period, the leading edge protection will have reduced noise compared to other periods of time.

In a fifth aspect, the present invention relates to a wind turbine comprising a wind turbine blade with a leading edge protection obtainable by the method according to the fourth aspect of the present invention. The wind turbine preferably comprises three of the aforementioned wind turbine blades.

It will be understood that any of the above-described features of the first aspect of the invention may be combined with the second, third, fourth and fifth aspect of the invention and vice versa.

DETAILED DESCRIPTION OF THE INVENTION

The invention is explained in detail below with reference to embodiments shown in the drawings, which shall not be construed as limitations.

Figure 2:
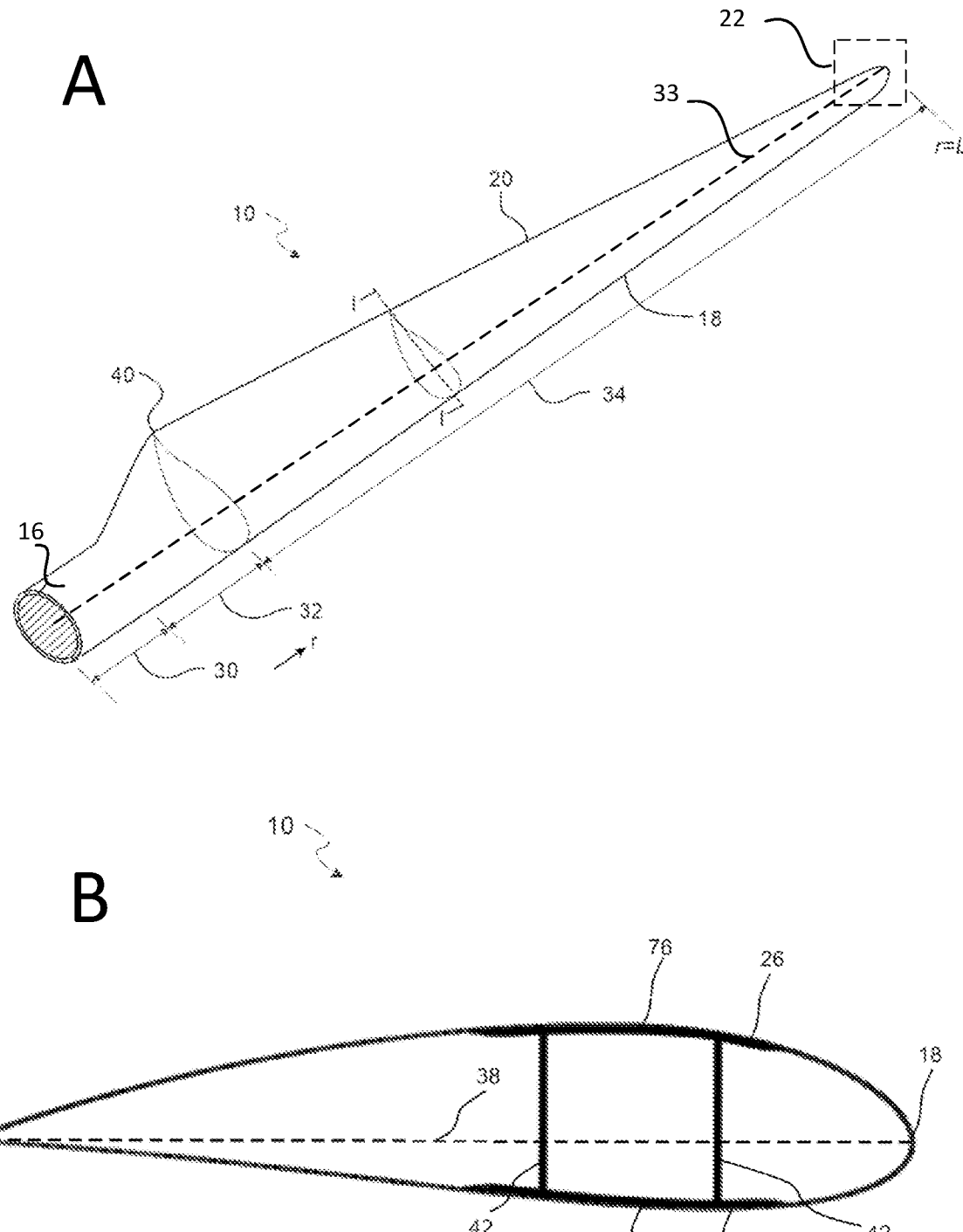
Figure 3:
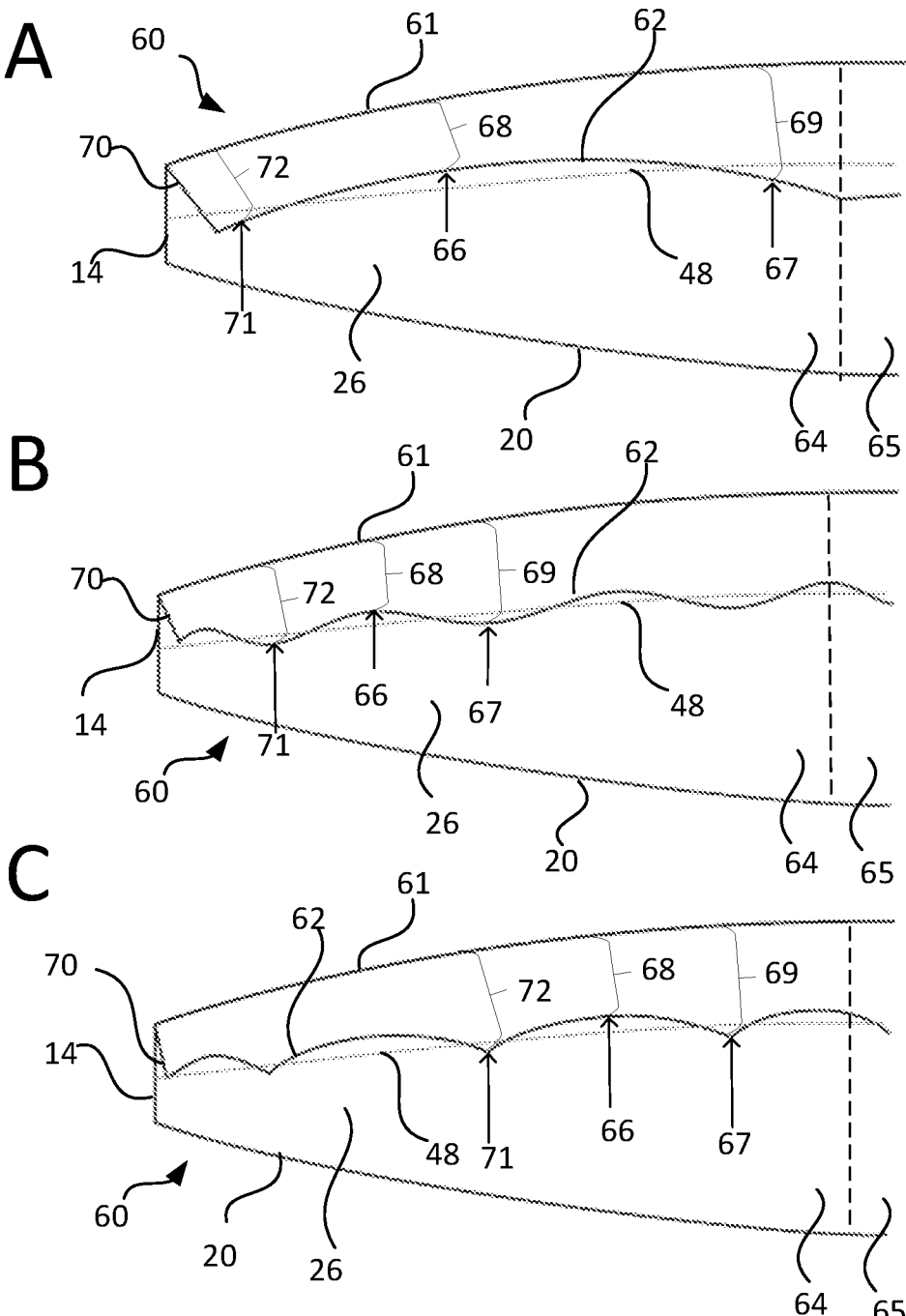
Figure 4:
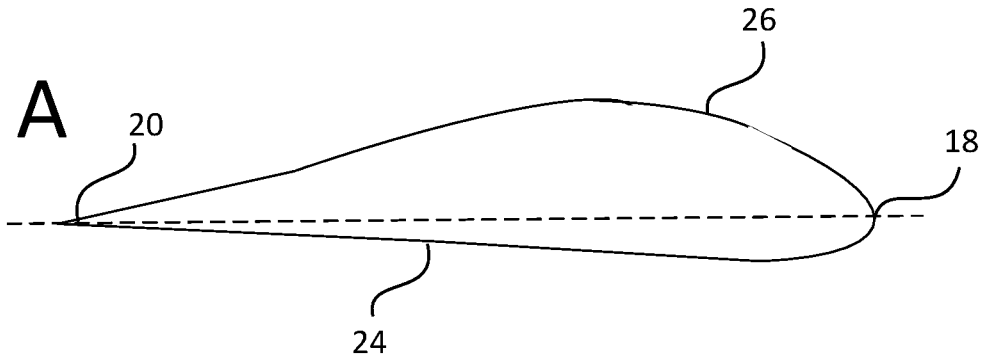
Figure 4:
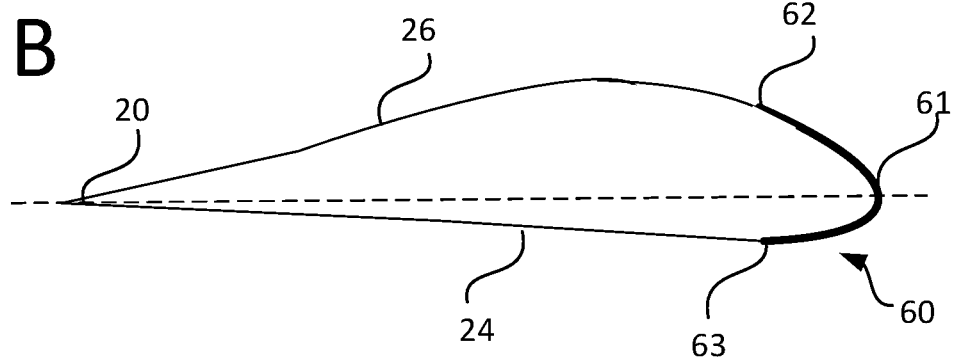
Figure 4:
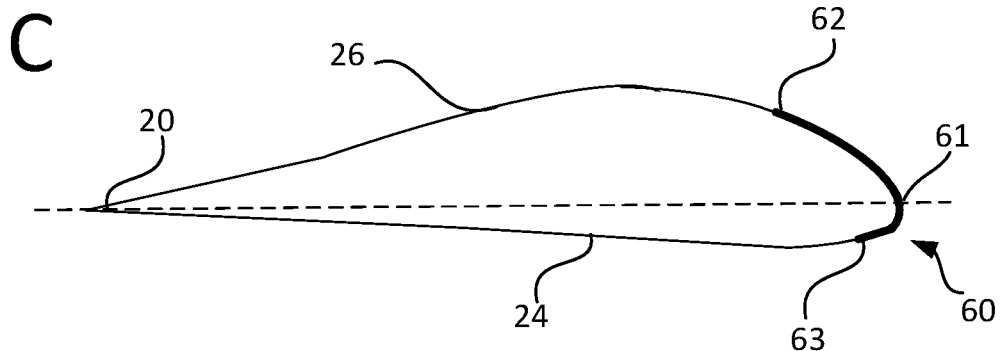
Figure 5:
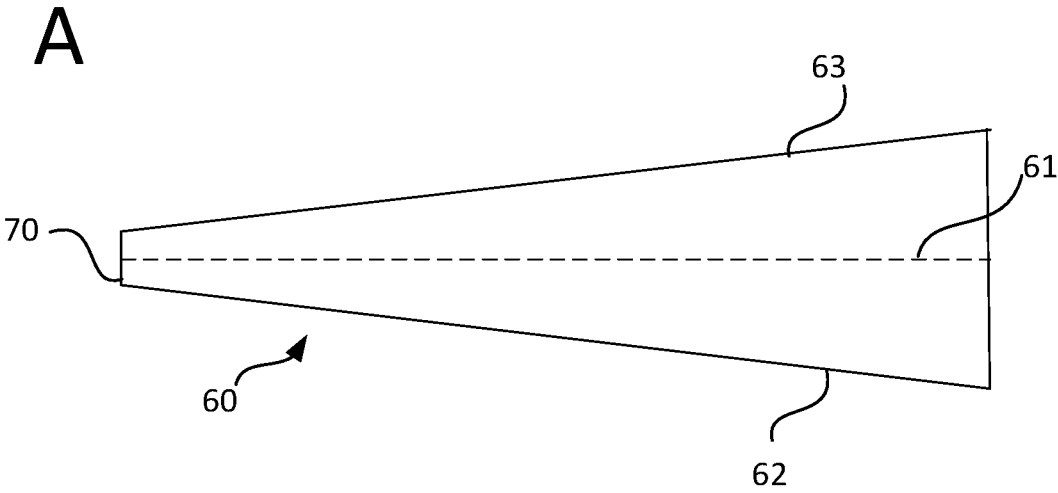
Figure 5:
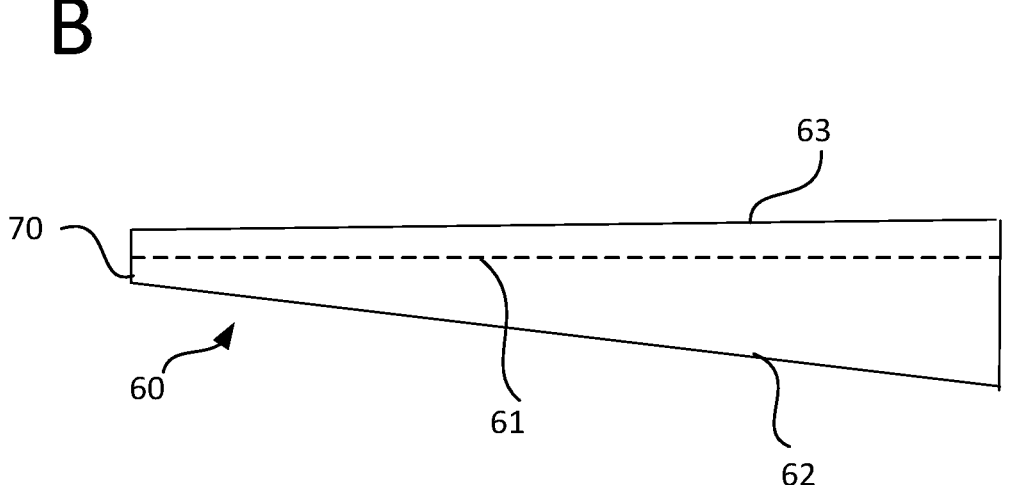

FIG. 1 is a schematic diagram illustrating a wind turbine,

FIG. 2 is a schematic diagram illustrating a three-dimensional and a cross-sectional view of a wind turbine blade, FIG. 3 is a schematic diagram illustrating a top view of a plurality of tip sections of a wind turbine blade, whereon a first part of a leading edge protection according to different embodiments of the present invention is fitted, FIG. 4 shows a schematic view of a cross-sectional view of a wind turbine blade onto which a symmetric or asymmetric leading edge protection is fitted, and FIG. 5 is a schematic illustration showing a top view of a symmetric and asymmetric planform configurations of a leading edge protection according to the present invention.

DETAILED DESCRIPTION

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2A shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The airfoil region 34 comprises a tip region 22 at the outmost part, where the airfoil region is most curved. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 30 typically increases with increasing distance r from the hub. The airfoil region 34 has an airfoil profile with a chord extending between the leading edge 18 and the trailing edge 20 of the blade 10. The width of the chord typically decreases with increasing distance r from the hub. A longitudinal axis of the blade extends from the centre of the root region 30 to the blade tip 14.

A shoulder 40 of the blade 10 is defined as the position where the blade 10 has its largest chord length. The shoulder 40 is typically provided at the boundary between the transition region 32 and the airfoil region 34.

It should be noted that the chords of different sections of the blade normally do not lie in a common plane since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross-sectional view of an exemplary wind turbine blade 10, e.g. a cross-sectional view of the airfoil region of the wind turbine blade 10. The wind turbine blade 10 comprises a leading edge 18, a trailing edge 20, a pressure side 24, a suction side 26, a first spar cap 44 and a second spar cap 46. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side.

FIG. 3 is a schematic diagram illustrating a side view of a plurality of tip sections 22 of a wind turbine blade, whereon a leading edge protection 60 according to different embodiments of the present invention is fitted.

The leading edge protection 60 comprises a leading edge axis 61 fitted on part of the leading edge of a wind turbine blade, and the leading edge protection 60 extends between the leading edge axis 61 and a first edge downstream a first side, i.e. the suction side 26 of the wind turbine blade. Furthermore, the leading edge protection 60 extends between the leading edge axis 61 and a second edge 63 downstream a second side, i.e. the pressure side 24 of the wind turbine blade (not visible in FIG. 3). The leading edge protection 60 in FIG. 3 comprises a first part 64 and a second part 65. The first part 64 of the leading edge protection 60 is fitted to the tip region 22 of the leading edge of the wind turbine blade. The tip region 22 is curved and extends from a tip 14 of the wind turbine blade. The second part 65 extends from the first part 64 and is fitted to the leading edge of the wind turbine blade along a section where the leading edge is substantially linear, i.e. along part of the remaining airfoil region 34. The second part 65 may be parallel to the leading edge of the wind turbine blade along the airfoil region, or it may be non-parallel to the leading edge and have one or more of the features as described for the first edge 62 of the first part 64.

The leading edge protection further comprises a third edge 70 extending between the leading edge axis 61 and the first edge 62, at a position most proximal to the tip 14 of the wind turbine blade. As can be seen in FIG. 3, the most proximal part of the leading edge axis 61 ends at a point more proximal to the tip 14 of the wind turbine blade than the most proximal part of the first edge 62. Thus, the third edge 70 extends between the most proximal part of the leading edge axis 61 and the most proximal part of the first edge 62 at an angle relative to the leading edge axis 61. In FIGS. 3A-3C, this angle is between around 50 and 80 degrees, i.e. around 50 degrees for FIG. 3A, around 65 degrees for FIG. 3B and around 80 degrees for FIG. 3C. An angle between 10 and 85 degrees makes fitting of the leading edge protection close to the tip easier and still allows the leading edge protection to cover part of the tip region close to the tip 14.

In FIGS. 3A-3C, the first edge 61 is non-parallel with the leading edge and the leading edge axis 61 of the wind turbine blade along the first part 64 of the leading edge protection 60. Furthermore, the first edge 61 of the leading edge protection 60 is non-linear along the first part 64 of the leading edge protection 60 when fitted onto the wind turbine blade.

In FIG. 3A, the first edge 61 is arch shaped or curved along the first part 64 of the leading edge protection 60, when the leading edge protection is fitted to the wind turbine blade. The leading edge protection comprises a first point 66 on the first edge 62 having a first distance 68 to the leading edge axis 61 and a second point 67 on the first edge 62 having a second distance 69 to the leading edge axis 61. The first and second points 66, 67 are each arranged on the first part 64 of the leading edge protection, with the first point 66 more proximal to the tip 14 of the wind turbine blade than the second point 67. As can be seen in FIG. 3A, the second distance 69 is larger than the first distance 68 with a ratio between the first distance 68 and the second distance 69 of around 1:2, and the first edge 61 is arch shaped or curved between the first and second points 66, 67. Furthermore, the leading edge protection comprises a third point 71 on the first edge 62 having a third distance 72 to the leading edge axis 61. The third point is arranged more proximal to the tip 14 than the first point 62, and the third distance 72 is slightly larger than the first distance 68, i.e. the distance to the leading edge axis 61 decreases from the third point 71 to the first point 62. In some embodiments, the third distance could be the same as the first distance, i.e. part of the first edge 62 may be parallel to the leading edge axis 61. However, it is preferred that it is not parallel at any points along the first part of the first edge and/or the natural transition line along the first part of the leading edge protection, to avoid feedback loops along the first part. The first, second and third points may be any points along the first edge falling within the description.

In FIGS. 3B and 3C, the first edge 61 extends in a repeating pattern along the first part 64 and the second part 65 of the leading edge protection 60. In FIG. 3B, the pattern is a wavy pattern and in FIG. 3C, the pattern is a crescent pattern. In each of FIGS. 3B and 3C, the leading edge protection comprises a first point 66 on the first edge 62 having a first distance 68 to the leading edge axis 61, a second point 67 on the first edge 62 having a second distance 69 to the leading edge axis 61 and a third point 71 having a third distance 72 to the leading edge axis 66. The third point is arranged more proximal to the tip 14 of the leading edge than the first point 62, and the first point is arranged more proximal to the tip 14 than the second point 67. The second distance 69 is larger than the first distance 68 with a ratio between the first distance 68 and the second distance 69 of around 1:1.05-1:1.25, and the third distance 72 is larger than the first distance 68 with a ratio between the third distance 72 and the first distance 68 of around 1:1.05-1:1.25. The first edge 61 is arch shaped or curved between the first and second points 66, 67 as well as between the third and first points 71, 66.

In FIGS. 3A-3C, the first edge 61 is non-parallel with a natural transition line 48 of the laminar boundary layer along the first part 64 of the leading edge protection 60. Furthermore, at least part of the first edge 62 is fitted to the first side of the wind turbine blade downstream of the natural transition line of the laminar boundary layer along the first part of the leading edge protection. In this way, acoustic-aerodynamic feedback loops will not form along the first edge, thereby decreasing sound waves at particular frequencies. In the embodiment shown in FIG. 3A, the first part 64 of the leading edge protection comprises a first region, in which the first edge 62 is located upstream of the natural transition line 48, the first region being arranged between two other regions, in which the first edge 62 is located downstream of the natural transition line 48. In all of the three embodiments, the first edge 62 crosses the natural transition line at a plurality of positions.

The second edge is not visible in FIG. 3. The leading edge protection may be symmetric or asymmetric around the leading edge axis 61.

FIG. 4 shows is a schematic diagram illustrating a cross-sectional view of a wind turbine blade, similar to that of FIG. 2B. FIG. 4A illustrates a cross-sectional view of a wind turbine blade with no leading edge protection, whereas FIGS. 4B and 4C illustrate the same cross-sectional view, whereon a leading edge protection 60 symmetric and asymmetric around the leading edge axis 61 is fitted onto the wind turbine blade, respectively.

The leading edge protection has a planform configuration before it is arranged on a wind turbine blade and an in-use configuration when it is fitted to the wind turbine blade. FIG. 5 is a schematic illustration showing a top view of a symmetric and asymmetric planform configurations of a leading edge protection 60 according to the present invention.

In FIG. 5A, the leading edge protection 60 is symmetric around the leading edge axis 61. Due to the curvature of a wind turbine blade at the tip region, a leading edge protection 60 with a trapezoid shape in the planform configuration as shown in FIG. 5A will have a curved first and second edge 62, 63 in the in-use configuration, similar to the first edge 62 illustrated in FIG. 3A.

FIG. 5B illustrates a leading edge protection 60 which is asymmetric around the leading edge axis 61, where the second edge 63 is substantially parallel to the leading edge axis 61 and configured to be substantially parallel to the leading edge of the wind turbine blade, when fitted to a wind turbine blade. Furthermore, a mean distance between the second edge 63 and the leading edge axis 61 is shorter than a mean distance between the first edge 62 and the leading edge axis along the leading edge protection 60, i.e. the area between the leading edge axis 61 and the first edge 62 is larger than the area between the leading edge axis 61 and the second edge 63.

The disclosure has been described with reference to a preferred embodiment. However, the scope of the invention is not limited to the illustrated embodiment, and alterations and modifications can be carried out without deviating from the scope of the invention.

EXEMPLARY EMBODIMENTS

Exemplary embodiments of the present disclosure are set out in the following items:

1. Wind turbine blade (10), which comprises a tip region as well as a leading edge and a trailing edge, wherein the wind turbine blade (10) is provided with a leading edge protection (60), wherein the leading edge protection comprises a leading edge axis that is fitted on at least part of the leading edge (18) of the wind turbine blade (10) and wherein the leading edge protection (60) extends between the leading edge and a first edge (62) downstream a first side (26) of the wind turbine blade (10) as well as between the leading edge and a second edge (63) downstream a second side (24) of the wind turbine blade (10), wherein the leading edge protection (60) comprises a first part (64), wherein the first edge (62) is configured non-parallel with the leading edge and/or a natural transition line (48) of the wind turbine blade (10) along the first part (64) of the leading edge protection (60).

2. Wind turbine blade (10) according to any of the preceding items, wherein the first side (26) is a suction side of the wind turbine blade (10) and the second side (24) is a pressure side of the wind turbine blade (10).

3. Wind turbine blade (10) according to any of the preceding items, wherein leading edge protection (60) is configured such that the first edge has an angle relative to the leading edge and/or the natural transition line that on average is at least 5 degrees along the first part (64) of the leading edge protection (60).

4. Wind turbine blade (10) according to any of the preceding items, wherein the leading edge protection is arranged to cross the natural transition line of the wind turbine blade such that the first edge is arranged upstream of the natural transition line along one or more regions and further is arranged downstream of the natural transition line along one or more other regions along the first part (64) of the wind turbine blade.

5. Wind turbine blade (10) according to item 4, wherein the first part (64) comprises at least a first region, in which the leading edge is located upstream of the natural transition line (48), the first region being arranged between two other regions in which the first edge is located downstream of the natural transition line (48).

6. Wind turbine blade (10) according to any of items 4-5, wherein the first edge (62) crosses the natural transition line (48) at a plurality of positions along the first part of the leading edge protection.

7. Wind turbine blade (10) according to any of the preceding items, wherein the leading edge protection (60) is arranged such that the first edge at all positions along the first part is located no more than 15 cm upstream of the natural transition line of the wind turbine blade.

8. Wind turbine blade (10) according to any of the preceding items, wherein the first part (64) of the leading edge protection (60) is fitted on a tip region of the leading edge of the wind turbine blade (10), wherein the tip region is curved and extends from a tip of the wind turbine blade (10).

9. Wind turbine blade (10) according to any of the preceding items, wherein the first edge (62) of the leading edge protection (60) is configured to be non-linear along the first part (64) of the leading edge protection (60).

10. Wind turbine blade (10) according to any of the preceding items, wherein the leading edge protection (60) comprises a first point (66) on the first edge (62) having a first distance (68) to the leading edge axis (61) and/or a natural transition line (48) and a second point (67) on the first edge (62) having a second distance (69) to the leading edge axis (61) and/or the natural transition line (48), wherein the first point (66) is configured to be arranged more proximal to the tip of the wind turbine blade (10) than the second point (67), wherein the first and second points (66, 67) are each arranged on the first part (64) of the leading edge protection (60) and wherein the second distance (69) is larger than the first distance (68) and optionally wherein the leading edge protection (60) further comprises a third point (71) on the first edge (62) having a third distance (72) to the leading edge axis (61) and/or the natural transition line (48), wherein the third point (71) is configured to be arranged more proximal to the tip (14) of the wind turbine blade (10) than the first point (66) and wherein the third distance (72) is larger than the first distance (68).

11. Wind turbine blade (10) according to any of the preceding items, wherein the first edge (62) is configured to be arch shaped or curved along part of the leading edge protection (60) or wherein the first edge (62) extends in a pattern along the first part (64) of the leading edge protection (60), such as a zig-zag pattern, a crescent pattern, a sawtooth pattern or a wavy pattern.

12. Wind turbine blade (10) according to any of the preceding items, wherein the first edge (62) is non-parallel with a natural transition line (48) of the laminar boundary layer along the first part (64) of the leading edge protection (60) and/or at least part of the first edge (62) is fitted to the first side (26) of the wind turbine blade (10) downstream of the natural transition line (48) of the laminar boundary layer along the first part (64) of the leading edge protection (60).

13. Wind turbine blade (10) according to any of the preceding items, wherein the leading edge protection (60) is configured to be symmetric around the leading edge (18) or wherein the leading edge protection (60) is configured to be asymmetric around the leading edge (18) of the wind turbine blade (10).

14. Wind turbine blade (10) according to any of the preceding items, wherein the second edge (63) is arranged to be substantially parallel to the leading edge of the wind turbine blade (10) along the first part (64), and a mean distance between the second edge (63) and the leading edge axis (61) and/or the natural transition line (48) is shorter than a mean distance between the first edge (62) and the leading edge axis (61) and/or the natural transition line (48) along the first part (64).

15. Wind turbine blade (10) according to any of the preceding items, wherein the leading edge protection (60) is a foil or a film with a thickness between 0.05 mm-10 mm, preferably between 0.05 mm-2 mm, and wherein the leading edge protection (60) comprises or essentially consists of an erosion-resistant material, such as polyurethane.

16. Wind turbine blade (10) according to any of the preceding items, wherein the leading edge protection (60) has a planform configuration before it is arranged on a wind turbine blade (10) and an in-use configuration when it is fitted to the wind turbine blade (10), and wherein the leading edge protection (60) is designed such that it has a trapezoid shape in the planform configuration and a curved first and/or second edge (63) in the in-use configuration.

17. Wind turbine blade (10) according to any of the preceding items, wherein the leading edge protection (60) comprises a groove or step with a wavy shape or spanwise discontinuous roughness elements upstream of the first edge (62).

18. Leading edge protection (60) for a wind turbine blade (10), wherein a leading edge axis (61) of the leading edge protection (60) is configured to be fitted on at least part of a leading edge (18) of a wind turbine blade (10) and the leading edge protection (60) is configured to extend between the leading edge and a first edge (62) downstream a first side (26) of the wind turbine blade (10) as well as between the leading edge and a second edge (63) downstream a second side (24) of the wind turbine blade (10), wherein the leading edge protection (60) comprises a first part (64) and wherein the first edge (62) is configured to be non-parallel with the leading edge and/or a natural transition line (48) of the wind turbine blade (10) along the first part (64) of the leading edge protection (60).

19. Leading edge protection (60) according to item 18, wherein the first side (26) is a suction side of the wind turbine blade (10) and the second side (24) is a pressure side of the wind turbine blade (10).

20. Leading edge protection (60) according to any of items 18-19, wherein leading edge protection (60) is configured such that the first edge has an angle relative to the leading edge and/or the natural transition line that on average is at least 5 degrees along the first part (64) of the leading edge protection (60).

21. Leading edge protection (60) according to any of items 18-20, wherein the leading edge protection is configured to cross the natural transition line of the wind turbine blade such that the first edge is arranged upstream of the natural transition line along one or more regions and further is arranged downstream of the natural transition line along one or more other regions along the first part (64) of the wind turbine blade.

22. Leading edge protection (60) according to item 21, wherein the first part (64) comprises at least a first region, in which the leading edge is located upstream of the natural transition line (48), the first region being arranged between two other regions in which the first edge is located downstream of the natural transition line (48).

23. Leading edge protection (60) according to any of items 21-22, wherein the first edge (62) crosses the natural transition line (48) at a plurality of positions along the first part of the leading edge protection.

24. Leading edge protection (60) according to any of items 18-23, wherein the leading edge protection (60) is configured such that the first edge at all positions along the first part is located no more than 15 cm upstream of the natural transition line of the blade.

25. Leading edge protection (60) according to any of items 18-24, wherein the first part (64) of the leading edge protection (60) is configured to be fitted on a tip region of the leading edge of the wind turbine blade (10), wherein the tip region is curved and extends from a tip of the wind turbine blade (10).

26. Leading edge protection (60) according to any of items 18-25, wherein the first edge (62) of the leading edge protection (60) is configured to be non-linear along the first part (64) of the leading edge protection (60).

27. Leading edge protection (60) according to any of items 18-26, wherein the leading edge protection (60) comprises a first point (66) on the first edge (62) having a first distance (68) to the leading edge axis (61) and/or a natural transition line (48) and a second point (67) on the first edge (62) having a second distance (69) to the leading edge axis (61) and/or the natural transition line (48), wherein the first point (66) is configured to be arranged more proximal to the tip of the wind turbine blade (10) than the second point (67), wherein the first and second points (66, 67) are each arranged on the first part (64) of the leading edge protection (60) and wherein the second distance (69) is larger than the first distance (68) and optionally wherein the leading edge protection (60) further comprises a third point (71) on the first edge (62) having a third distance (72) to the leading edge axis (61) and/or the natural transition line (48), wherein the third point (71) is configured to be arranged more proximal to the tip (14) of the wind turbine blade (10) than the first point (66) and wherein the third distance (72) is larger than the first distance (68).

28. Leading edge protection (60) according to any of items 18-27, wherein the first edge (62) is configured to be arch shaped or curved along part of the leading edge protection (60) when the leading edge protection (60) is fitted to the wind turbine blade (10) or wherein the first edge (62) extends in a pattern along the first part (64) of the leading edge protection (60), such as a zig-zag pattern, a crescent pattern, a sawtooth pattern or a wavy pattern.

29. Leading edge protection (60) according to any of items 18-28, wherein the first edge (62) is configured to be non-parallel with a natural transition line (48) of the laminar boundary layer along the first part (64) of the leading edge protection (60) and/or at least part of the first edge (62) is configured to be fitted to the first side (26) of the wind turbine blade (10) downstream of the natural transition line (48) of the laminar boundary layer along the first part (64) of the leading edge protection (60).

30. Leading edge protection (60) according to any of items 18-29, wherein the leading edge protection (60) is configured to be symmetric around the leading edge (18) or wherein the leading edge protection (60) is configured to be asymmetric around the leading edge (18) of the wind turbine blade (10).

31. Leading edge protection (60) according to any of items 18-30, wherein the second edge (63) is configured to be substantially parallel to the leading edge of the wind turbine blade (10) along the first part (64), and a mean distance between the second edge (63) and the leading edge axis (61) and/or the natural transition line (48) is shorter than a mean distance between the first edge (62) and the leading edge axis (61) and/or the natural transition line (48) along the first part (64).

32. Leading edge protection (60) according to any items 18-31, wherein the leading edge protection (60) is a foil or a film with a thickness between 0.05 mm-10 mm, preferably between 0.05 mm-2 mm, and wherein the leading edge protection (60) comprises or essentially consists of an erosion-resistant material, such as polyurethane.

33. Leading edge protection (60) according to any of items 18-32, wherein the leading edge protection (60) has a planform configuration before it is arranged on a wind turbine blade (10) and an in-use configuration when it is fitted to the wind turbine blade (10), and wherein the leading edge protection (60) is designed such that it has a trapezoid shape in the planform configuration and a curved first and/or second edge (63) in the in-use configuration.

34. Leading edge protection (60) according to any of items 18-33, wherein the leading edge protection (60) comprises a groove or step with a wavy shape or spanwise discontinuous roughness elements upstream of the first edge (62).

35. Method for protecting a leading edge of a wind turbine blade (10) arranged on a wind turbine (2), the method comprising the steps of:

determining a plurality of operating conditions under which the wind turbine (2) will be operated for a period of time, estimating a plurality of locations of a natural transition lines of a laminar boundary layer on a first side (26) of the wind turbine blade (10) based on the plurality of operating conditions and an estimation of wind conditions during the period of time, designing a leading edge protection (60) for the wind turbine blade (10) according to any of items 18-34, such that the first edge along a first part (64) of the leading edge protection (60) is configured to be non-parallel with the natural transition line or lines (48) under the plurality of operating conditions and/or such that part of the first edge is configured to be fitted to the first side (26) of the wind turbine blade (10) downstream of the natural transition line (48) along the first part (64) of the leading edge protection (60), fitting the leading edge protection (60) to the wind turbine blade (10).

36. A wind turbine (2) comprising a number of wind turbine blades (10), preferably three wind turbine blades (10).

LIST OF REFERENCE NUMERALS 2 wind turbine
4 tower
6 nacelle
8 hub
10 wind turbine blade
14 blade tip
16 blade root
18 leading edge
20 trailing edge
22 tip region
24 pressure side/second side
26 suction side/first side
30 root region
32 transition region
33 longitudinal axis
34 airfoil region
38 chord line
40 shoulder/position of maximum chord
42 shear webs
44 first spar cap
46 second spar cap
48 natural transition line of laminar boundary layer
60 leading edge protection
61 leading edge axis
62 first edge
63 second edge
64 first part
65 second part
66 first point
67 second point
68 first distance
69 second distance
70 third edge
71 third point
72 third distance

The invention claimed is:

1. A wind turbine blade (10) comprising a tip region, a leading edge and a trailing edge, wherein the wind turbine blade (10) is provided with a leading edge protection (60), wherein the leading edge protection comprises a leading edge axis that is fitted on at least part of the leading edge (18) of the wind turbine blade (10), and wherein the leading edge protection (60) extends between the leading edge and a first edge (62) downstream a first side (26) of the wind turbine blade (10) as well as between the leading edge and a second edge (63) downstream a second side (24) of the wind turbine blade (10), wherein the leading edge protection (60) comprises a first part (64), wherein the first edge (62) is non-parallel with a natural transition line (48) of the wind turbine blade (10) along the first part (64) of the leading edge protection (60), wherein the natural transition line is a line at which laminar flow at an operational condition at a design point of the wind turbine blade (10) transitions into turbulent flow on or over a surface of the wind turbine blade (10), and wherein the leading edge protection (60) is arranged to cross the natural transition line of the wind turbine blade (10) such that the first edge (62) is arranged upstream of the natural transition line along one or more regions and is further arranged downstream of the natural transition line along one or more other regions along the first part (64) of the wind turbine blade (10).

2. The wind turbine blade (10) according to claim 1, wherein the first side (26) is a suction side of the wind turbine blade (10) and the second side (24) is a pressure side of the wind turbine blade (10).

3. The wind turbine blade (10) according to claim 1, wherein leading edge protection (60) is configured such that the first edge has an angle relative to the natural transition line that on average is at least 5 degrees along the first part (64) of the leading edge protection (60).

4. The wind turbine blade (10) according to claim 1, wherein the first part (64) comprises at least a first region, in which the leading edge is located upstream of the natural transition line (48), the first region being arranged between two other regions in which the first edge is located downstream of the natural transition line (48).

5. The wind turbine blade (10) according to claim 1, wherein the first edge (62) crosses the natural transition line (48) at a plurality of positions along the first part of the leading edge protection.

6. The wind turbine blade (10) according to claim 1, wherein the leading edge protection (60) is arranged such that the first edge at all positions along the first part is located no more than 15 cm upstream of the natural transition line of the wind turbine blade.

7. The wind turbine blade (10) according to claim 1, wherein the first part (64) of the leading edge protection (60) is fitted on a tip region of the leading edge of the wind turbine blade (10), wherein the tip region is curved and extends from a tip of the wind turbine blade (10).

8. The wind turbine blade (10) according to claim 1, wherein the first edge (62) of the leading edge protection (60) is configured to be non-linear along the first part (64) of the leading edge protection (60).

9. The wind turbine blade (10) according to claim 1, wherein the leading edge protection (60) comprises a first point (66) on the first edge (62) having a first distance (68) to the natural transition line (48) and a second point (67) on the first edge (62) having a second distance (69) to the natural transition line (48), wherein the first point (66) is configured to be arranged more proximal to the tip of the wind turbine blade (10) than the second point (67), wherein the first and second points (66, 67) are each arranged on the first part (64) of the leading edge protection (60) and wherein the second distance (69) is larger than the first distance (68).

10. The wind turbine blade (10) according to claim 1, wherein the first edge (62) is configured to be arch shaped or curved along part of the leading edge protection (60) or wherein the first edge (62) extends in a pattern along the first part (64) of the leading edge protection (60).

11. The wind turbine blade (10) according to claim 1, wherein the first edge (62) is non-parallel with a natural transition line (48) of the laminar boundary layer along the first part (64) of the leading edge protection (60) and/or at least part of the first edge (62) is fitted to the first side (26) of the wind turbine blade (10) downstream of the natural transition line (48) of the laminar boundary layer along the first part (64) of the leading edge protection (60).

12. The wind turbine blade (10) according to claim 1, wherein the second edge (63) is arranged to be substantially parallel to the leading edge of the wind turbine blade (10) along the first part (64), and a mean distance between the second edge (63) and the natural transition line (48) is shorter than a mean distance between the first edge (62) and the natural transition line (48) along the first part (64).

13. The wind turbine blade (10) according to claim 1, wherein the leading edge protection (60) is a foil or a film with a thickness between 0.05 mm to 10 mm, and wherein the leading edge protection (60) comprises or essentially consists of an erosion-resistant material.

14. The wind turbine blade (10) according to claim 1, wherein the leading edge protection (60) has a planform configuration before it is arranged on a wind turbine blade (10) and an in-use configuration when it is fitted to the wind turbine blade (10), and wherein the leading edge protection (60) is designed such that it has a trapezoid shape in a pre-installation configuration and a curved first and/or second edge (63) in the in-use configuration.

15. The wind turbine blade (10) according to claim 1, wherein the leading edge protection (60) comprises a groove or a step with a wavy shape.

16. A wind turbine (2) comprising a number of the wind turbine blade (10) according to claim 1.

17. A leading edge protection (60) for a wind turbine blade (10), wherein a leading edge axis (61) of the leading edge protection (60) is configured to be fitted on at least part of a leading edge (18) of a wind turbine blade (10) and the leading edge protection (60) is configured to extend between the leading edge and a first edge (62) downstream a first side (26) of the wind turbine blade (10) as well as between the leading edge and a second edge (63) downstream a second side (24) of the wind turbine blade (10), wherein the leading edge protection (60) comprises a first part (64) and wherein the first edge (62) is configured to be non-parallel with a natural transition line (48) of the wind turbine blade (10) along the first part (64) of the leading edge protection (60), wherein the natural transition line is a line at which laminar flow at an operational condition at a design point of the wind turbine blade (10) transitions into turbulent flow on or over a surface of the wind turbine blade (10), and wherein the leading edge protection (60) is configured to be arranged to cross the natural transition line of the wind turbine blade (10) such that the first edge (62) is arranged upstream of the natural transition line along one or more regions, and is further configured to be arranged downstream of the natural transition line along one or more other regions along the first part (64) of the wind turbine blade (10).

18. The leading edge protection (60) according to claim 17, wherein the first side (26) is a suction side of the wind turbine blade (10) and the second side (24) is a pressure side of the wind turbine blade (10).

19. The leading edge protection (60) according to claim 17, wherein leading edge protection (60) is configured such that the first edge has an angle relative to the natural transition line that on average is at least 5 degrees along the first part (64) of the leading edge protection (60).

20. The leading edge protection (60) according to claim 17, wherein the first part (64) comprises at least a first region, in which the leading edge is located upstream of the natural transition line (48), the first region being arranged between two other regions in which the first edge is located downstream of the natural transition line (48).

21. The leading edge protection (60) according to claim 17, wherein the first edge (62) crosses the natural transition line (48) at a plurality of positions along the first part of the leading edge protection.

22. The leading edge protection (60) according to claim 17, wherein the leading edge protection (60) is configured such that the first edge at all positions along the first part is located no more than 15 cm upstream of the natural transition line of the blade.

23. The leading edge protection (60) according to claim 17, wherein the first part (64) of the leading edge protection (60) is configured to be fitted on a tip region of the leading edge of the wind turbine blade (10), wherein the tip region is curved and extends from a tip of the wind turbine blade (10).

24. The leading edge protection (60) according to claim 17, wherein the first edge (62) of the leading edge protection (60) is configured to be non-linear along the first part (64) of the leading edge protection (60).

25. The leading edge protection (60) according to claim 17, wherein the leading edge protection (60) comprises a first point (66) on the first edge (62) having a first distance (68) to the natural transition line (48) and a second point (67) on the first edge (62) having a second distance (69) to the natural transition line (48), wherein the first point (66) is configured to be arranged more proximal to the tip of the wind turbine blade (10) than the second point (67), wherein the first and second points (66, 67) are each arranged on the first part (64) of the leading edge protection (60) and wherein the second distance (69) is larger than the first distance (68).

26. The leading edge protection (60) according to claim 17, wherein the first edge (62) is configured to be arch shaped or curved along part of the leading edge protection (60) when the leading edge protection (60) is fitted to the wind turbine blade (10) or wherein the first edge (62) extends in a pattern along the first part (64) of the leading edge protection (60).

27. The leading edge protection (60) according to claim 17, wherein the first edge (62) is configured to be non-parallel with a natural transition line (48) of the laminar boundary layer along the first part (64) of the leading edge protection (60) and/or at least part of the first edge (62) is configured to be fitted to the first side (26) of the wind turbine blade (10) downstream of the natural transition line (48) of the laminar boundary layer along the first part (64) of the leading edge protection (60).

28. The leading edge protection (60) according to claim 17, wherein the second edge (63) is configured to be substantially parallel to the leading edge of the wind turbine blade (10) along the first part (64), and a mean distance between the second edge (63) and the natural transition line (48) is shorter than a mean distance between the first edge (62) and the natural transition line (48) along the first part (64).

29. The leading edge protection (60) according to claim 17, wherein the leading edge protection (60) is a foil or a film with a thickness between 0.05 mm to 10 mm, and wherein the leading edge protection (60) comprises or essentially consists of an erosion-resistant material.

30. The leading edge protection (60) according to claim 17, wherein the leading edge protection (60) has a planform configuration before it is arranged on a wind turbine blade (10) and an in-use configuration when it is fitted to the wind turbine blade (10), and wherein the leading edge protection (60) is designed such that it has a trapezoid shape in a pre-installation configuration and a curved first and/or second edge (63) in the in-use configuration.

31. The leading edge protection (60) according to claim 17, wherein the leading edge protection (60) comprises a groove or a step with a wavy shape.

32. A method for protecting a leading edge of a wind turbine blade (10) arranged on a wind turbine (2), the method comprising the steps of:

determining a plurality of operating conditions under which the wind turbine (2) will be operated for a period of time, estimating a plurality of locations of natural transition lines of a laminar boundary layer on a first side (26) of the wind turbine blade (10) based on the plurality of operating conditions and an estimation of wind conditions during the period of time, designing a leading edge protection (60) for the wind turbine blade (10) according to claim 17, such that the first edge along a first part (64) of the leading edge protection (60) is configured to be non-parallel with the natural transition lines (48) under the plurality of operating conditions and/or such that part of the first edge is configured to be fitted to the first side (26) of the wind turbine blade (10) downstream of the natural transition line (48) along the first part (64) of the leading edge protection (60), fitting the leading edge protection (60) to the wind turbine blade (10).

* * * * *